(12) United States Patent
Zheng et al.

(10) Patent No.: US 6,391,465 B1
(45) Date of Patent: May 21, 2002

(54) COMPOSITION USEFUL FOR TREATING METAL SURFACES

(75) Inventors: Haixing Zheng, Reseda; Su-Jen Ting, Stevenson Ranch; Cheng-Jye Chu, Los Angeles, all of CA (US)

(73) Assignee: Chemat Technology, Inc., Northridge, CA (US)

( * ) Notice: Subject to any disclaimer, the term of this patent is extended or adjusted under 35 U.S.C. 154(b) by 0 days.

(21) Appl. No.: 09/087,227

(22) Filed: May 29, 1998

Related U.S. Application Data

(62) Division of application No. 08/521,915, filed on Nov. 6, 1995, now Pat. No. 5,807,430.

(51) Int. Cl.$^7$ .............................................. B32B 15/08
(52) U.S. Cl. ........................................ 428/450; 428/448
(58) Field of Search ........................ 106/287.11, 287.13, 106/287.15, 287.16, 287.17, 287.19; 428/447, 448, 450, 413, 414, 416, 418

(56) References Cited

U.S. PATENT DOCUMENTS

| | | | |
|---|---|---|---|
| 4,369,222 A | 1/1983 | Hedrick et al. | 428/216 |
| 4,374,933 A | 2/1983 | Scholze et al. | 521/64 |
| 4,460,654 A | 7/1984 | Interrante | 428/428 |
| 4,754,012 A | 6/1988 | Yoldas et al. | 528/10 |
| 4,832,990 A | 5/1989 | Boccalon et al. | 427/388.1 |
| 4,988,396 A | 1/1991 | Bibber | 148/269 |
| 5,118,581 A | 6/1992 | Shalaby | 428/433 |
| 5,131,987 A | 7/1992 | Nitowski et al. | 205/201 |
| 5,139,601 A * | 8/1992 | Holmes-Farley et al. | 156/329 |
| 5,175,027 A | 12/1992 | Holmes-Farley et al. | 427/387 |
| 5,182,143 A | 1/1993 | Holmes-Farley et al. | 427/409 |
| 5,206,285 A | 4/1993 | Castellucci | 524/588 |
| 5,316,855 A | 5/1994 | Wang et al. | 428/447 |
| 5,336,748 A | 8/1994 | Castellucci | 528/38 |

OTHER PUBLICATIONS

PCT International Search Report, date Mar. 14, 1997, for International Application No. PCT/US96/17770.

* cited by examiner

*Primary Examiner*—D. S. Nakarani
(74) *Attorney, Agent, or Firm*—Janah & Assoc., P.C.; Ashok Janah

(57) ABSTRACT

A composition suitable for treating metal surfaces prior to bonding of the surfaces to materials including metals, rubber, glass, polymers, sealants, coatings, and in particular polymeric adhesives, to enhance the strength of the bond and to prolong useful life in corrosive environments, is described. The composition comprises: (a) water; (b) metal alkoxide comprising $M(OR)_x$, where M is a metal and R is an alkyl group; and (c) organoalkoxysilane comprising silane coupling functional groups capable of bonding with the material to be bonded to the metal surface; and (d) acid to promote hydrolysis and cross-linking of the metal alkoxide and organoalkoxysilane, wherein the molar ratio of metal alkoxide:organoalkoxysilane:acid is selected such that the composition is characterized by: (i) an extended shelf life, and (ii) is capable of cross-linking when applied to the metal surface to form an adherent coating having a substantially uniform distribution of metal, silicon, and oxygen species through the thickness of the coating, (iii) is capable of bonding with the material to be bonded to the metal surface to form a strong adherent bond between the metal surface and the material to be bonded to the metal surface. Also described is a method of using the composition to bond metal surfaces to one another.

7 Claims, 1 Drawing Sheet

COMPOSITION USEFUL FOR TREATING METAL SURFACES

CROSS-REFERENCE

Figure 1:
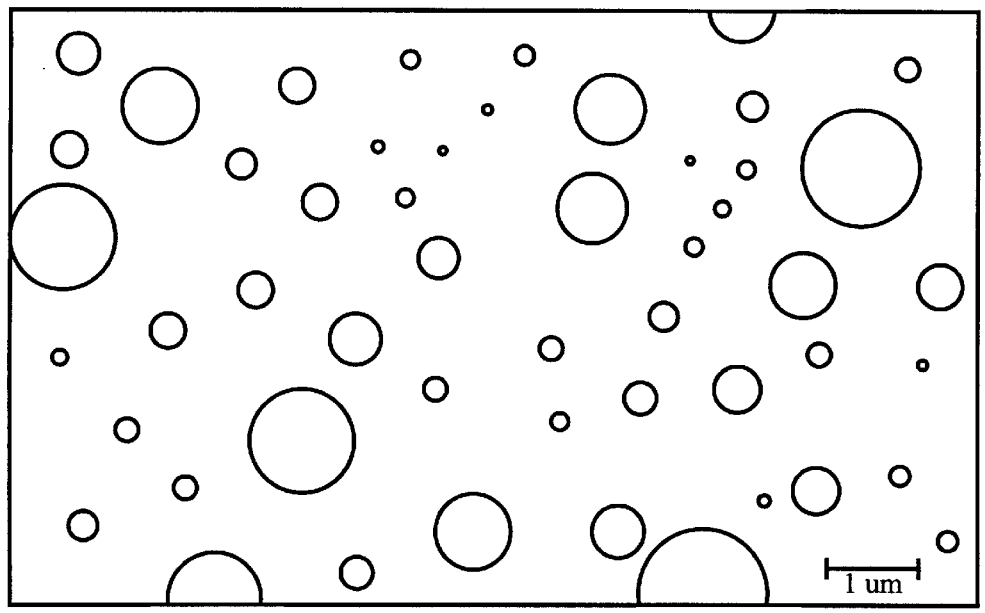

This application is a divisional of U.S. patent application Ser. No. 08/521,915, entitled "Method and Composition Useful for Treating Metal Surfaces," filed Nov. 6, 1995, by Zheng, et al., now U.S. Pat. No. 5,807,430, which is incorporated herein by reference.

BACKGROUND

This invention relates to a composition and method useful for treating metal surfaces to enhance bonding of the metal surfaces to other materials, and in particular to enhance bonding of metal surfaces.

Materials such as metals, polymers, and ceramics are bonded to one another, or bonded to coatings such as polymers, enamel, glass, ceramic, magnetic ferrite, or refractory materials. Examples of industrial applications include the bonding of structural metal or composite assemblies using polymeric adhesives, widely used in the aircraft industry, and increasingly used in the chemical engineering and automobile industry. For example, aluminum alloy components are adhesive bonded to one another to form structural aircraft components having reduced weights and which can be manufactured at lower costs. Other examples include powder painted aluminum components, and aluminum bonded to PTFE coatings to yield non-stick or low friction surfaces. In these applications the metal surfaces of the components are chemically treated prior to bonding to promote adherence and corrosion resistance of the adhesive-bonded joint or interface between the metal components. For example, a typical three layer adhesive-bonded joint between two aluminum alloy components comprises (1) an aluminum oxide layer on the aluminum component surface; (2) a primer layer on the oxide layer; and (3) an epoxy adhesive layer on the primer layer for bonding the aluminum components to one another.

The durability and corrosion resistance of the joint between the metal surface and the material bonded to the metal surface is particularly important in structural applications, such as aircraft structures, because these joints are exposed to a wide range of environmental conditions with extreme temperatures, high humidity, and highly corrosive marine environments. To avoid failure of the joint as well as to meet stringent commercial passenger and cargo aircraft standards, the adhesive-bonded joint of the structural component must withstand the harsh environmental conditions, and in particular resistance to corrosion and disbonding in humid salt laden environments, especially those resulting from sea spray or deicing materials. Failure of these joints often starts with diffusion of water through the adhesive followed by corrosion of the underlying metal structure. Thus it is desirable to have a method and composition useful for bonding metal surfaces that delays onset of corrosion and exhibits stability in aqueous and salt laden environments.

Conventional surface treatment processes have several disadvantages. Current pretreatment processes include anodizing the metal surface in a bath of: (i) chromic acid as disclosed in U.S. Pat. No. 4,690,736; sulfuric acid as disclosed in U.S. Pat. No. 4,624,752; (ii) phosphoric acid; (iii) oxalic acid; or (iv) a mixture of sulfuric and chromic acids. These processes form a partially hydrated oxide coating on the metal surface. The partially hydrated oxide coatings corrode in humid environments, for example aluminum oxide coatings on aluminum surfaces corrode to form aluminum hydroxide, in particular a mixture of boehmite ($Al_2O_3H_2O$) and pseudo-boehmite ($Al_2O_3H_2O$), which is mechanically weak and adheres poorly to the aluminum metal. Further hydration leads to formation of bayerite $Al(OH)_3$ which results in disbanding of the joint. Thus, conventional anodizing processes can lead to hydration instability and failure of the joint.

Another disadvantage of chromate and phosphate based anodizing processes is that these processes typically use large amounts of water to neutralize the treated metal surfaces, and to rinse off the corrosive acids used for anodization of the metal surface. Disposal of the phosphate or chromate containing waste water is expensive and can be environmentally hazardous. Commercial anodizing processes also require large amounts of electricity to sustain an anodizing current in the anodizing bath, particularly for large metal components, and require expensive equipment such as large anodizing and rinsing tanks, automatic systems for transferring the metal component from the anodizing tank to the rinsing tank, and sizable electrical power supplies. Thus it is desirable to have a bonding composition and method that does not use excessive amounts of water or electricity, and that can be used without large capital outlays for expensive equipment.

Another disadvantage of conventional treatment processes is their narrow processing window. Deviation from the processing window can result in poor bonding. For example, in phosphoric acid anodizing processes, if the metal component is not removed from the phosphoric acid bath immediately after the anodization current is turned off, the anodized oxide coating formed on the metal component can be rapidly dissolved by the corrosive chromic or phosphoric acid bath, resulting in a loosely bonded oxide coating. Thus, it is desirable to have a surface treatment process that provides a relatively large processing window to allow flexible production schedules while minimizing failure of the bonded joint.

Another significant disadvantage of conventional surface treatment processes arises from their use of highly toxic and hazardous chemicals, such as hexavalent chromium compounds. Chromic compound rinses are used to seal phosphoric acid treated metal surfaces to provide adequate corrosion resistance. Disposal of the waste chromic byproducts, and the large amount of metal sludge dissolved in the acid, has become increasingly expensive in view of stringent environmental regulations and standards. Thus many conventional surface treatment processes are being gradually phased out because of the environmental regulations. Therefore, it is also desirable to have a non-toxic surface treatment process that is substantially environmentally benign.

SUMMARY

The present invention satisfies these needs. In one aspect, the present invention provides a bonded structure comprising a first component having a first surface bonded to a second surface of a second component by a bond layer comprising an adhesion layer, wherein the adhesion layer comprises a cured liquid composition comprising water, a metal alkoxide of the formula $M(OR)_x$ where M is a metal and R is an alkyl group, an organoalkoxysilane, and an acid. Preferably, the molar ratio of metal alkoxide:organoalkoxysilane:acid is selected so that the adhesion layer formed upon curing the liquid composition forms a strong and corrosion-resistant joint between them. Preferably, the organoalkoxysilane comprises silane functional components or groups that can react and bond to the two surfaces. The first and second surfaces are preferably metal surfaces.

In another preferred embodiment, the present invention provides a bonded structure comprising a first component having a first surface bonded to a second surface of a second component by a bond layer comprising an adhesion layer, wherein the adhesion layer comprises a cured liquid composition comprising water, metal alkoxide of formula $M(OR)_x$ where M is metal and R is an alkyl group, a single organoalkoxysilane, and an acid. Preferably, the molar ratio of metal alkoxide:organoalkoxysilane:acid is preferably from about 1:0.5:0.1 to about 1:15:0.8, and more preferably from about 1:1:0.2 to about 1:8:0.5.

DRAWINGS

Figure 2:
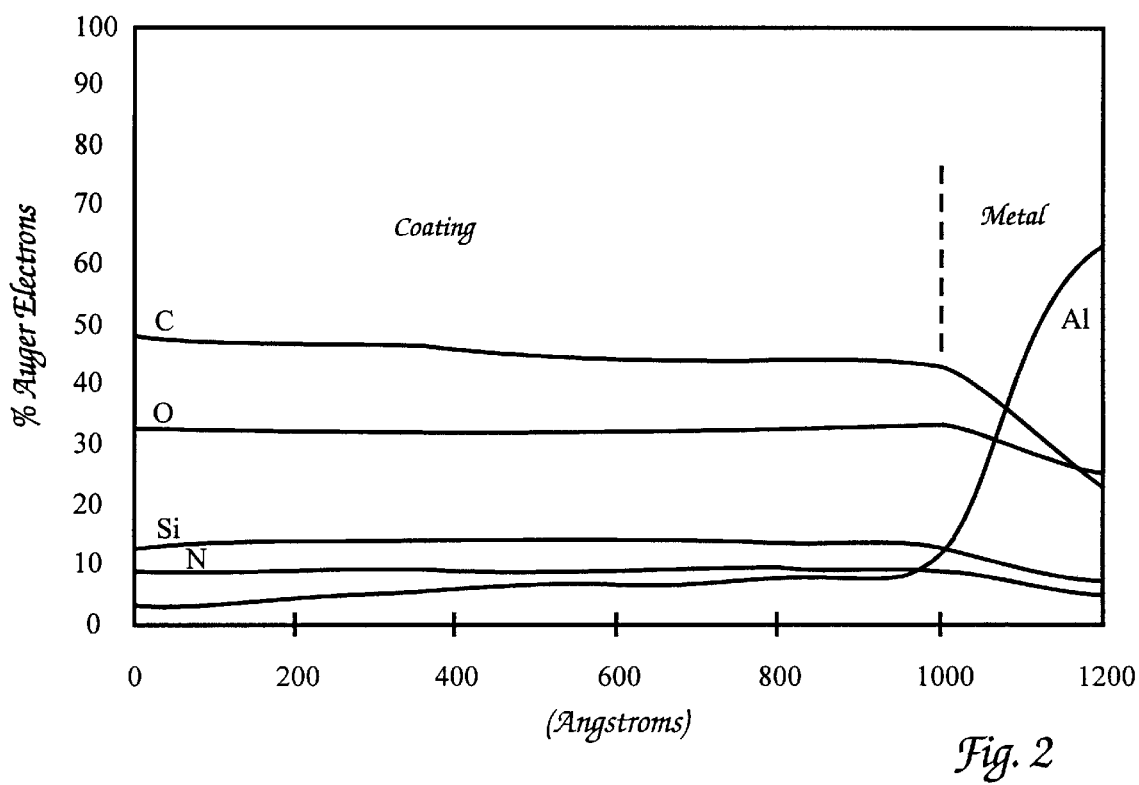

These and other features, aspects, and advantages of the present invention will become better understood with reference to the following description, appended claims and accompanying illustrative drawings, where:

FIG. 1 is a schematic of a scanning electron photo of a typical pore size distribution observed in a coating formed using the composition and method of the present invention; and FIG. 2 is an auger electron spectrograph showing the uniform distribution of metal, silicon and oxygen through the thickness of a coating formed using the composition and method of the present invention.

DESCRIPTION

The composition and method of the present invention is useful for treatment of metal surfaces prior to bonding of the metal surfaces to other materials, including metals, rubber, glass, polymers, sealants, coatings, and in particular polymeric adhesives to enhance surface adhesion properties and prolong useful life in corrosive environments. The composition is particularly useful for promoting corrosion resistance and adhesion of metals, such as aluminum, steel, zinc, titanium, galvanized or plated metals, and alloys.

Although the surface treatment composition and process is illustrated by providing an example of adhesive bonding of structural aluminum for air frames and automobiles (as used herein the word "aluminum" includes high purity aluminum, commercial purity aluminum and aluminum based alloys, such as for example the 2000 series (Al—Cu alloys) and the 7000 series (Al—Zn—Mg alloys), the composition and method can also be used in other applications, for example to promote (i) paint adhesion, particularly if corrosion resistance is important as in air frames; (ii) polymer adhesion, for example PTFE bearings on aluminum, etc.; and (iii) adhesion of electroplated coatings. Thus, it should be appreciated that modifications made by those skilled in the art to the examples of the composition and method described herein, are within the scope of the invention.

The composition of the present invention generally comprises (i) water; (ii) metal alkoxide comprising $M(OR)_x$, where R is an alkyl group; (iii) organoalkoxysilane comprising silane coupling functional groups capable of bonding with the material to be bonded to the metal surface; and (iv) acid to promote hydrolysis and cross-linking of the metal alkoxide and organoalkoxysilane. The molar ratio of metal alkoxide:organoalkoxysilane:acid is selected such that the composition is characterized by: (i) an extended shelf life, and (ii) is capable of cross-linking when applied to the metal surface to form an adherent coating having a substantially uniform distribution of metal, silicon, and oxygen species through the thickness of the coating, (iii) is capable of bonding with the material to be bonded to the metal surface to form a strong adherent bond between the metal surface and the material bonded thereto.

The metal alkoxide and organoalkoxysilane are mixed together in the water to form a stable liquid solution or dispersion useful for coating the metal surface. Preferably, the water comprises distilled and deionized water. Optionally, the composition can also comprise conventional solvents useful for dissolving and dispersing organic compounds. Both the water and solvent at least partially hydrolyse the metal alkoxide of the composition. Suitable solvents include any solvent miscible with water, and more preferably miscible with the metal alkoxide and the organoalkoxysilane, including alcohols, such as methanol, ethanol, and more preferably isopropanol.

The metal alkoxide of the composition typically has the stoichiometric formula $M(OR)_x$, where R comprises at least one alkyl group having the stoichiometry $C_xH_{2x+1}$, and M is a metal. Suitable metal alkoxides include $Si(OR)_4$, $Al(OR)_3$, $Ti(OR)_4$, $Zr(OR)_4$, $Ta(OR)_3$, and $Hf(OR)_4$. Preferably, the metal component of the metal alkoxide is selected to match the metal of the metal surface to be coated to obtain optimal reactivity of the alkoxide with the metal surface. Matching the metal of the alkoxide to the metal surface allows the metal alkoxide to form a stronger and more adherent coating on the metal surface which resists corrosion and hydration in a humid environment. For example, $Si(OR)_4$ can be used to bond silicon surfaces, $Al(OR)_3$ can be used to bond aluminum surfaces, $Ti(OR)_4$ can be used to bond titanium surfaces, and $Zr(OR)_4$ can be used to bond zirconium surfaces, $Ta(OR)_3$ can be used to bond tantalum surfaces, and $Hf(OR)_3$ can be used to bond hafnium surfaces.

The metal alkoxide is dispersed in the water using conventional methods. For example, one method of dispersing an metal alkoxide in water comprises dripping the metal alkoxide into excess water under rigorous stirring. When aluminum alkoxide is dripped into water, the alkoxide is partially hydrolysed to yield condensates that are crystalline above 80° C., and amphorous below 80°. While crystalline phase (boehmite) is unaffected by aging, the amorphous phase is unstable and can be converted into crystalline boehmite when heated above 80° C. or into bayerite, $Al(OH)_3$, if kept below 80° C., in water. Both the crystalline and amorphous forms of aluminum monohydroxide (AlO(OH)) are peptized to obtain clear alumina sol solutions by the acid present in the liquid dispersion. Typically, the composition comprises a colloidal dispersion having an average particle diameter from about 0.01 to about 1 micron.

The metal alkoxide can also be dissolved or suspended in a solvent that is miscible with water. In the latter case, the metal alkoxide solution is simply added to the water to form a liquid solution or dispersion, without extensive stirring or mixing.

The organoalkoxysilane compound used in the composition has silane functional components or groups that can react and bond to the material to be bonded to the metal surface. Suitable organoalkoxysilane compounds are selected from the group consisting of aminopropyltrimethoxysilane, aminopropyltriethoxysilane, N-beta-aminoethyl-gamma-propylmethyldimethoxysilane, N-beta-aminoethyl-gamma-propyltrimethoxysilane, divinyldimethoxysilane, divinyldi-beta-methoxyethoxysilane, di(gamma-glycidoxypropyl)

dimethoxysilane, vinyltriethoxysilane, vinyltris-beta-methoxyethoxysilane, gamma-glycidoxypropyl trimethoxysilane, gamma-methacryloxypropyltrimethoxysilane and beta-(3,4-epoxycyclohexyl)ethyltrimethoxysilane. When a polymeric adhesive is bonded to the metal surface, preferably, the organoalkoxysilane contains an amine functionality. Preferred aminoalkoxysilanes include aminopropyltrimethoxysilane.

The acid of the composition is used to catalyze hydrolysis and cross-linking of the metal alkoxide. Preferred acids include nitric acid, hydrochloric, acetic acid, dichloriacetic and monochloracetic and formiacid. Hydrofluoric, iodic, sulfuric, phosphoric boric, oxalic, phthalic, citric and carbamic acids can also be used. The molar ratio of the acid to water is preferably from about 0.0002 to about 20, and more preferably from about 0.004 to about 17. The type and concentration of the acid catalyst can be tailored to yield coatings having linear, branched, two-dimensional, or three-dimensional cross-linked networks.

The molar ratio of metal alkoxide:organoalkoxysilane:acid is selected such that the composition has an extended shelf life, preferably being stable for at least about 1 week, and more preferably stable for at least about 1 month. The stable shelf allows for fabrication, delivery and storage of the premixed composition without undesirable hydrolysis or cross-linking of the composition.

The molar ratio of metal alkoxide:organoalkoxysilane:acid is selected such that the composition is capable of forming an adherent coating having pores extending through the coating, at least about 50% of the pores having an average pore diameter of at least about 0.1 micron, and more preferably an average pore diameter of from about 0.1 to about 10 micron. Most preferably, at least about 50% of the pores in the adherent coating extend through substantially the entire thickness of the coating. A schematic of a scanning electron photo of a typical pore size distribution observed in a coating formed using the composition and method of the present invention is shown in FIG. 1. It is seen that a large number of pores, typically at least 50% and more typically at least 70% have an average pore diameter of at least about 0.1 micron. The size, distribution and length of the pores in the adherent coating allow for enhanced bonding between the metal surfaces and material to be bonded thereto, by forming a tortuous pore structure that allows the bonding material to physically permeate into, and couple with, the adherent coating, thereby forming a strong and corrosion resistant bond.

The molar ratio of metal alkoxide:organoalkoxysilane:acid is also selected such that the composition can form an adherent coating having a substantially uniform distribution of metal, silicon, carbon, nitrogen and oxygen species through the thickness of the coating, as shown In the auger electron spectrograph of FIG. 2. The percentages of each of the metal, silicon, carbon, nitrogen and oxygen species are substantially uniformly distributed through the thickness of tho coating such that the percentages of each of the species deviates by less than 10% through the thickness. The uniform distribution of metal, silicon, carbon, nitrogen and oxygen through the thickness of a coating formed provides a relatively homogeneous bond between tho metal surface and the material to be bonded to the metal surface. A homogeneous bond is advantageous when the bond is exposed to elevated or reduced operating temperatures, because the homogeneous bond composition reduces the possibility of obtaining thermal expansion mismatch between non-homogeneous or anisotropic bond structures. Reduced thermal expansion mismatch increases the usefulness of the bonded structures formed using the composition of the present invention at sub-zero and hot temperature.

A preferred molar ratio of metal alkoxide:organoalkoxysilane:acid which provides the desired characteristics for the composition is from about 1:0.5:0.1 to about 1:15:0.8, and more preferably from about 1:10.2 to about 1:8:0.5. In the preferred compositions the molar ratio of metal alkoxide:organoalkoxysilane is typically from about 0.01 to about 5, and more typically from about 0.5 to 3.

When solvent is added to the composition, the molar ratio of metal alkoxide to organoalkoxysilane can change depending on the ratio of water to solvent. For example, when the solvent to water molar ratio is less than about 0.5, the molar ratio of metal alkoxide to organoalkoxysilane is preferably from about 0.01 to about 5, more preferably from 0.05 to 2, and most preferably from about 0.1 to about 0.3. Thus, a suitable composition preferably comprises metal alkoxide in a concentration of about 0.3 to about 1.4 wt %, and more preferably from 0.5 to 1.1 wt %; and organoalkoxysilane in a concentration of about 1 to about 8 wt %, and more preferably from 1 to 6 wt %.

Similarly, when the ratio of solvent to water is greater than 2, the molar ratio of metal alkoxide to organoalkoxysilane is preferably from about 0.2 to about 1.2, more preferably from 0.4 to 0.9, and most preferably from about 0.6 to about 0.8. Thus, a suitable composition preferably comprises metal alkoxide in a concentration of about 0.5 to about 4.5 wt %, and more preferably 1.5 to 3.5 wt %; and organoalkoxysilane in a concentration of about 0.5 to 4.5 wt %, and more preferably from 1.7 to 3.7 wt %.

The composition described can also include additives such as rust preventive compounds, for example molybdic acid or chromic acid; rust proofing agents such as phenolic carboxylic acids, for example tannic acid and gallic acid; and/or zirconium compound such as ammonium zirconyl carbonate, to attain increased corrosion resistance.

A method for using the composition of the present invention to treat metal surfaces prior to bonding of the metal surfaces will now be described. It should be noted that the surface treatment according to the invention is not only suitable in the manufacturing industry but is also suitable for application by hand to small areas for repairing joints. The metal surface is prepared prior to coating with the composition of the present invention, by degreasing and cleaning the metal surface using conventional methods to remove oil and grease contaminants on the surface. Degreasing can be carried out using trichlorethylene vapor in a solvent vapor degreasing tank. The metal surface is then scoured in an aqueous alkaline solution, such as a 10% sodium hydroxide solution, or degreased using conventional alkaline cleaners. Thereafter, the metal surface is rinsed in water by immersion in tap water for about 2–5 minutes.

Optionally, the cleaning treatment can be followed by a deoxidizing treatment with water rinsing between the deoxidation steps. Suitable deoxidizing solutions include solutions of TURCO-SMUT-GO #4, commercially available from Turco Products, Westminister, Calif.; or a solution comprising 27–36 wt % sulfuric acid and 22–35 g/L ferric iron. After immersing the metal surface in the deoxidizer solution for about 10 to 12 minutes at 60 to 65° C., the surface is rinsed with warm tap water for ten minutes and allowed to air dry.

The clean metal surface is dried and thereafter coated with the composition of the present invention, by dip coating, painting, spraying or spin coating. In dip coating process, the substrate is dipped into the coating composition and typically withdrawn vertically at a constant speed. The thickness of the coating is primarily dependent on (i) the concentration and viscosity of the coating composition, and (ii) the withdrawal speed, because the film formed on the metal surface runs down along the metal surface leaving behind a residue of coating composition. The substrate withdrawing speed can range from 0.5 cm/min to 40 cm/min and is preferably from 2.4 to 17.6 cm/min. During the dip coating process, the coating composition can be maintained at any temperature below the boiling point of the water and is preferably maintained at room temperature. In the spray coating process, a thin uniform coating can be obtained by moving the substrate at a constant speed below an atomized spray of the coating composition.

After coating the metal surface with the coating composition, the coated metal surface is heat treated at low temperatures to remove residual solvent, and to cross-link and polymerize the composition to form the adherent coating. The coated metal surface is typically heat to a temperature ranging from room temperature to 150° C., and more typically from 60 to 120° C., for about 30 to 60 minutes. The porosity and pore size of the coating can be controlled by the heat treatment and relative humidity. The resultant adherent coating on the metal surface typically has a thickness in the submicron range, and more typically from about 0.05 to about 5 microns, and more typically from 0.1 to 1 micron.

It is believed that the water, metal alkoxide, organoalkoxysilane and acid of the composition forms peptized alkoxide-silane colloids suspended in the water. It is further believed that heat treatment of the coated composition on the metal surface, results in hydrolysis, cross-linking and condensation of the composition to provide an adherent coating having a uniform distribution of metal, silicon and oxygen. In a typical hydrolysis reaction, an metal alkoxide ligand is replaced with a hydroxyl ligand as follows:

$$M(OR)_z + H_2O \rightarrow M(OR))_{z-1}(OH+ROH) \qquad (1)$$

Thereafter, condensation reactions involving the hydroxyl ligands produce polymers having M—O—M or M—OH—M bonds, and by-product water or alcohol. For example, condensation of an aluminum alkoxide comprises the sequential reactions:

$$Al(OR)_2OH + Al(OR)_3 \rightarrow (RO)_2Al\text{—}O(OR)_2 + ROH \qquad (2)$$

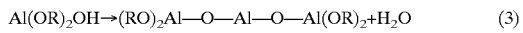

$$Al(OR)_2OH \rightarrow (RO)_2Al\text{—}O\text{—}Al\text{—}O\text{—}Al(OR)_2 + H_2O \qquad (3)$$

The resultant adherent coating contains functional groups that enhance adhesion of the metal surface by coupling or polymerizing with the material to be bonded to the metal surface, and in particular with the polymeric adhesive used to bond metal surfaces to one another. Another advantage of the present composition is that tailored coating microstructures with the desired pore sizes, volume, distribution and lengths can be formed in the adherent coating, to provide a tortuous pore structure that provides enhanced bonding capability.

Also, the adherent coating typically resists hydration by diffused moisture and protects the underlying metal surface from corrosion. In addition, the composition is environmentally benign and can be used to coat large areas for mass production, at low costs, and without the use of toxic chemicals, and without use of large amounts of water or electrical power. In this manner, the composition of the present invention provides an unusually adherent and corrosion resistant coating.

An exemplary adhesive-bonded joint formed between two or more metal surfaces using the composition of the present invention will now be described. A typical adhesive-bonded joint between metal surfaces comprises of (i) adherent coatings of the composition of the present invention on the metal surfaces; (ii) optionally, a primer applied on the coatings; and (iii) a polymeric adhesive, such as an epoxy, for bonding the primed metal surfaces to one another.

First the metal surfaces are coated with the composition of the present invention, and thereafter heat treated to hydrolyse and cross-link the composition. Thereafter, the coated surface is preferably primed using a primer to reduce the chemical activity of the adherent coatings which can readily adsorb contaminants when exposed to the atmosphere, yielding inferior joints.

Any conventional primer can be used to prime the coated metal surface, the primer being selected according to the polymeric adhesive used in the bonding process. Primers containing a ketone-type solvent and chromium as a corrosion inhibitor are suitable but are undesirable because of their environmental toxicity. Water-based adhesive primers such as the 6747 and 6757 primer, commercially available from Cytech Company, Weston, Mich., are preferred because of their reduced environmental toxicity, and typically require a 120° C. cure.

A polymeric adhesive, such as an epoxy adhesive is applied to the coated metal surfaces for bonding the metal surfaces to one another. Common epoxy adhesives include the EA-9649 resin, commercially available from Dexter Company, or the FM73, FM-300 or FM-330 resins commercially available from the aforementioned Cytech Company.

After application of the polymeric adhesive to the coated metal surfaces, the metal surfaces are joined to one another, and the joint is firmly held during heat treatment at a temperature and pressure suitable for curing and bonding the metal surfaces to one another. For example for the FM-73 film adhesive from Cytech Company, a suitable heat treatment is at a temperature of from about 120° C. for about 60 minutes, under an applied pressure of about 40 psi.

Metal surfaces joined using the composition and process of the present invention have high shear strengths and good corrosion resistance in harsh environments. The shear strength of a metal joint fabricated using a water based composition of the present invention as measured by the lap shear joint test described in ASTM D 100-72, was typically above 5500 psi, and often close to 5900 psi. These shear strengths are equivalent to the shear strengths obtained using conventional phosphoric acid anodizing processes. Also, the coatings exhibited good thermodynamic and hydrolytic stability as well as corrosion resistance. Further, coated aluminum alloy samples showed no difference in mechanical fatigue tests compared to untreated samples.

The environmental stability of the joints formed using the process of the present invention were tested using a wedge crack test according to ASTM 3762-79. Within the tested range, the coatings yielded substantially equivalent crack growth than that obtained from phosphoric anodizing processes which indicates good environmental stability. Typical initial crack lengths from the wedge crack test were in the range of 1.1 inch to 1.3 inch.

EXAMPLE 1

The following examples demonstrate the suitable of the composition and method for coating and bonding aluminum alloy substrates. Aluminum alloy 2024-T3 substrates to be coated by the method of the present invention were cleaned by immersion in a warm degreasing Brulin 815D detergent (diluted 1:15 in water) for 10 minutes until surface dirt was removed, followed by a warm tap water rinse for 10 minutes. After cleaning, the substrates were immersed in warm alkaline ISOPREP 44 cleaning solution (60 g/L in water) for five minutes and then rinsed with warm tap water for 10 minutes. The cleaned substrates were then immersed in a deoxidizer solution before applying coatings. The deoxidizer solution was prepared by dissolving 13 g of TURCO-SMUT-GO #4 in one liter of 14% nitric acid solution. After immersed in the deoxidizer solution for 10 minutes, the aluminum alloys were rinsed with warm tap water for ten minutes and allowed to air dry.

The coating composition was made by adding 140 ml (0.55 mole) of aluminum sec-butoxide to 900 ml of distilled water, while stirring at 80° C. for minutes. The resultant solution was allowed to cool down before adding 10 ml of 70% nitric acid (0.15 mole). The solution was then refluxed at 80° C. for a few hours until a slightly cloudy solution was obtained. This water-based aluminum alkoxide solution was then diluted to $1/16$ its original concentration. 4 ml of 3-aminopropyltrimethoxysilane was slowly added to 100 ml of the diluted solution while stirring to yield a coating composition with a colloidal dispersion.

The dry substrates were coated in a bath of the coating composition using the dip-coating method. The substrate withdrawing speed varied from 17.6 cm/min to 2.4 cm/min. The coated substrates were dried in air and then heat treated in an oven at 125° C. for one hour. Thereafter, BR127 primer manufactured by Cytech Company was applied on the coated surface of the substrates using a paintbrush. The primer was cured at 120° C. for 30 minutes in an oven. The substrates were then bonded using FM73 film adhesive manufactured by Cytech Company and the bonded substrates were cured in a platen press for one hour at 120° C. with 40 psi pressure. The shear strength of the lap shear specimens were determined on an Applied Test Systems model 900 using a cross-head speed of 0.05 in/min. The lap shear strength of the bonded metal surfaces were equivalent to those of joints assembled from samples anodized by a phosphoric acid anodization process, demonstrating the equivalent bond strength of the present coatings. The failure is at or within the adhesive, and not in the bonding layer, indicating that the bond formed by the coating is stronger than the adhesive.

The wedge crack specimens were cracked according to ASTM D-3762-79, the initial crack length was marked, and the specimen then were placed in a humidity chamber maintained at 95% relative humidity and 60° C. Crack growth was measured using a microscope at 15 times enlargement after one hour in the chamber. The wedge crack test data shows that joints assembled from substrates which were treated with the coating composition of the present invention exhibited small crack growths in the range of 0.03 to 0.05 inch. Minimal crack growth is an indication of good hydrothermal stability of the bonded joint. Failure also occurred in the adhesive layer, not in the bonding layer, indicating that the bond formed by the coating is stronger than the adhesive.

EXAMPLE 2

This example is similar to example 1 except that a different coating composition was used. The coating composition used in this example was prepared by adding 18 ml of 3-aminopropyltrimethoxysilane and 18 ml of aluminum sec-butoxide to 180 ml of dry isopropanol. The solution was well mixed, and 1 ml of 99.5% acetic acid added after mixing. The resultant solution was stirred overnight at room temperature in a closed bottle to reduce exposure to air or moisture, to form the coating composition. The coating composition was then coated on aluminum alloy substrates, which were then cross-linked and bonded as described above.

The lap shear strength of substrates bonded using this coating composition were equivalent to joints bonded from samples anodized with phosphoric acid. Furthermore, the wedge crack test show that the joints exhibited small crack growth in the range of 0.01 to 0.05 inch.

EXAMPLE 3

This example is similar to example 1 except that a non-chromated deoxidizer was used to deoxidize the substrate, the deoxidizing solution being a 27.5% nitric acid solution. The substrates to be coated were deoxidized in the nitric acid solution for one hour followed by warm water rinse. Thereafter, the coating composition and method described in Example 1 was used to bond the aluminum alloy substrates to one another. The lap shear strength of joints of substrates prepared using the non-chromated deoxidizing process had average strengths of 5983 psi, and the wedge crack tests yielded crack growth of 0.066 inch.

EXAMPLE 4

This example is similar to example 1 except that instead of using a primer before bonding, a 10% solution of 3-aminopropyltrimethoxysilane in isopropanol was used as a primer. The silane solution was applied onto the coated surface using a paintbrush and then cured at 120° for 30 minutes. Thereafter, the coating composition and method described in Example 1 was used to bond the aluminum alloy substrates to one another. The lap shear strength of joints of bonded substrates prepared using the non-chromated, non-commercial primer were an average of about 5379 psi.

The composition and process of the present invention has numerous advantages. The composition is non-toxic and allows use of an environmentally benign surface treatment process for metal surfaces that enhances bonding strength, delays onset of corrosion, and exhibits stability in aqueous and salt laden environmental conditions. The surface treatment process also provides a relatively large processing window, and minimizes failure of adhesive bonded joints. Further, excessive amounts of water or electricity are not required. Also, the surface treatment process can be applied by painting or spraying and does not require large capital outlays.

Although the present invention has been discussed in considerable detail with reference to certain preferred versions thereof, other versions are possible. For example, the coating composition, treatment time, and coating process conditions be varied from those specifically disclosed to produce a surface coating tailored for a particular surface composition to provide a mechanically strong and corrosion resistant bond. Other additives known in the art may also be included in the treatment process to further improve bonding of the metal surface, including for example, acids such as oxalic, chromic and malonic acids. Therefore, the spirit and scope of the appended claims should not be limited to the description of the preferred versions contained herein.

What is claimed is:

1. A bonded structure comprising a first component having a first surface bonded to a second surface of a second component by a bond layer comprising an adhesion layer having a substantially uniform distribution of metal, silicon, carbon, nitrogen and oxygen species through a thickness of the adhesion layer, whereby the percentages of each of the species deviates by less than 10% through the thickness, and wherein the adhesion layer is formed by curing a liquid composition comprising water; a metal alkoxide selected from the group consisting of $Al(OR)_3$, $Ti(OR)_4$, $Zr(OR)4$, $Ta(OR)_3$ and $Hf(OR)_4$; an aminoalkoxysilane; and an acid; and wherein the liquid composition comprises a molar ratio of metal alkoxide:aminoalkoxysilane:acid of from about 1:0.5:0.1 to about 1:15:0.8.

2. The bonded structure of claim 1 wherein the molar ratio of metal alkoxide:aminoalkoxysilane:acid in the liquid composition is from about 1:1:0.2 to about 1:8:0.5.

3. The bonded structure of claim 1 wherein the aminoalkoxysilane comprises one or more of aminoalkoxysilanes selected from the group consisting of aminopropyltrimethoxysilane, aminopropyltriethoxysilane, N-beta-aminoethyl-gamma-propylmethyldimethoxysilane, and N-beta-aminoethyl-gamma-propyltrimethoxysilane.

4. The bonded structure of claim 3 wherein the aminoalkoxysilane is aminopropyltrimethoxysilane.

5. The bonded structure of claim 1 wherein the liquid composition further comprises a solvent capable of dissolving the metal alkoxide.

6. The bonded structure of claim 1 wherein one or both of the first or the second surfaces is a metal surface.

7. The bonded structure of claim 1 wherein the metal alkoxide comprises aluminum sec-butoxide.

* * * * *